G. W. FLEMING.
WATER CLOSET VALVE.
APPLICATION FILED JAN. 19, 1909.
955,780.
Patented Apr. 19, 1910.
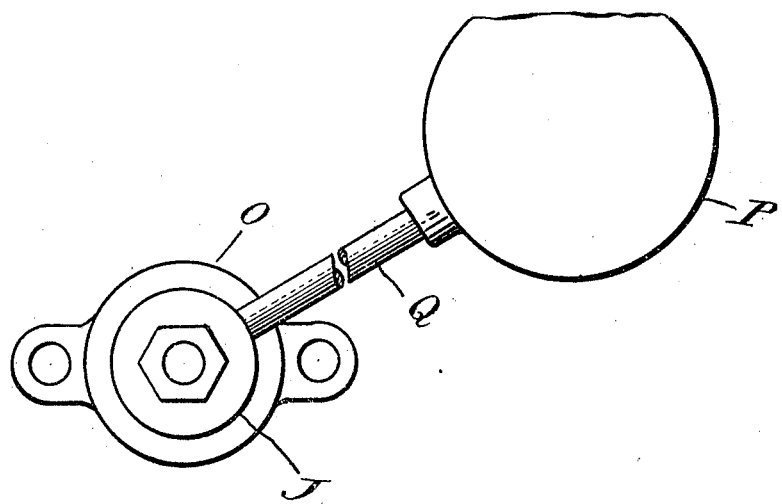
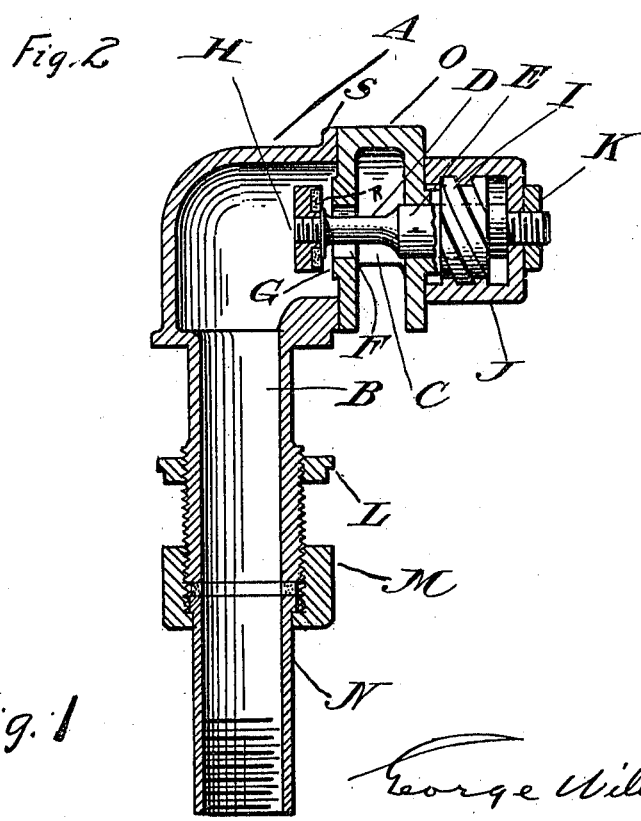

UNITED STATES PATENT OFFICE.

GEORGE WILLIAM FLEMING, OF BRADFORD, PENNSYLVANIA.

WATER-CLOSET VALVE.

955,780.  Specification of Letters Patent.  Patented Apr. 19, 1910.

Application filed January 19, 1909. Serial No. 473,106.

*To all whom it may concern:*

Be it known that I, GEORGE WILLIAM FLEMING, citizen of the United States, residing at Bradford, in the county of McKean and State of Pennsylvania, have invented certain new and useful Improvements in Water-Closet Valves, of which the following is a specification.

The object of my invention is to provide a method of opening the inlet valve of a water closet valve or ball cock, against the pressure of the water supplying the water closet, by means of the force of gravity upon a float in the tank of the water closet, when the water therein is removed by opening the flush valve of the closet, the float being connected with and operating a male screw thread meshing with a female screw thread, herein called operating screw, having a lead between one turn in one half of an inch, and one turn in one and a half inches; said male screw thread being connected with and operating said inlet valve.

The further object of my invention is to provide by aforesaid construction for the automatic self-closing of said inlet valve by the force of the pressure of water in the line supplying the water closet operating against the outside face of said inlet valve when the weight or inertia of the float is overcome or balanced by the rising water in the tank; the pressure of the water in the line acting longitudinally against the valve being sufficient to overcome the light friction in my specially constructed operating screw.

The further object of my invention being to provide by aforesaid construction, a water closet valve or ball cock, with an automatic self-closing inlet valve, and means for keeping the same closed by the pressure of the water in the line supplying the water closet.

The further object of my invention being to provide by aforesaid construction for the aforesaid automatic closing of the inlet valve in cases where the arm of the float breaks, or the float should become detached from its arm, in which cases by my peculiar construction the inlet valve remains closed, and no water runs through the closet or is wasted.

I am aware that water closet valves or ball cocks have been made to open against the pressure by means of the float in the tank operating a screw thread connecting therewith, and also connected with the inlet valve, but the screw threads in constructions heretofore made have been of such a fine lead that the longitudinal travel thereby given to the inlet valve was not sufficient to permit the inflow of water required to make the valve practical for use. I am also aware that some water closet valves have been made to open against the pressure, which have been constructed with lever or cam connections operating the float.

My invention includes special features of construction, arrangement and combination of parts hereinafter described and particularly pointed out in the claims.

An embodiment of my invention is illustrated in the accompanying drawings of which:

Figure 1 is a sectional view thereof, made at right angles with the float rod. Fig. 2 is a plan view of the end.

The body of the valve is of any approved form, preferably L shaped, and consists of a valve body "A," with a threaded end fitted or machined to project through the tank of the water closet; said threaded end being provided with a jam nut "L," for fastening said body "A" securely to the tank, the valve body "A" having a flange "S," at the outer end, permitting same to be screwed or bolted on the outlet body "O." The valve body "A" has a cored section "B" through its entire length, permitting the passage therethrough of the water. It is also connected with the water supply pipe by a hollow tail piece "N," said tail piece "N" being held in position by a packing nut "M." The outlet body "O" is provided with a cored section "C" open on one side, which connects with the chamber "B" of the valve body "A," by means of an orifice "F." The outlet body "O" is provided at its outer end with a male screw thread "I," having a lead between one turn in one half of an inch, and one turn in one and a half inches; said outlet body "O" also having an opening for stem "E" to pass therethrough. An operating cap "J" has upon the inside of said cap a female screw thread of the same lead as the male screw thread in the outlet body "O," said female screw thread meshing with the male screw thread "I." The stem "E" is cylindrical in form with a recessed portion "D," and a reduced screw threaded portion on its inner end for receiving the valve "H;" also a reduced screw threaded portion at its outer end for receiving the check nut "K." A float "P" is connected by a rod "Q" with the operating cap "J," and the outer face of the valve "H" is recessed to receive the packing ring "R," which engages the valve seat "G."

The operation of the ball cock of my construction is as follows: When the flush valve is open in the water closet, the water in the tank is discharged into the bowl of the closet, which permits the float in the tank to drop by gravity; the dropping of the float through its arm connection with the operating cap revolves the operating cap, and the female thread on the inner side of the cap meshing with the male thread on the outlet body, the threads being of a lead between one turn in one half an inch and one turn in one and a half inches, gives sufficient longitudinal travel to the valve stem that it causes the valve stem on the valve on the inner end thereof to move longitudinally against the pressure away from the valve seat; said valve stem passing through and revolving within said male thread, thus causing the water in the supply pipe and in the body of the valve to pass through the inlet valve thus opened, and the orifice "F," into the outlet body "O," and from thence through the chamber "C" into the tank, and as the water thus rises in the tank it overcomes the weight and inertia of the float, permitting the pressure of the water in the valve body to force against the inner face of the valve and longitudinally set it up against its seat, overcoming the slight friction of the operating male and female threads, thus again completely closing the inlet valve, where it is held firmly against its seat by the pressure of the water in the line and valve body until the flush valve is again opened by an operator.

Having thus described my invention, what I claim is:

1. In combination with a supply main having a valve seat therein, a valve engaging with said seat and opening against the pressure of water, a valve stem having screw threads thereon and an operable part having screw threads thereon engaging with the threads on the stem for opening said valve, said threads being of a pitch that will allow the valve to be closed automatically by the pressure of the water alone.

2. A device for opening the inlet valve of a water closet against the pressure of the water in the line supplying the closet and for closing the inlet valve by and with such pressure, comprising a suitable valve body having a cored section and means for attaching the same to the tank of a water closet; an outlet body connected with the outer end of the valve body, the outlet body having a chamber and an outlet from said chamber communicating with the water closet tank, the cored section of the valve body communicating through an orifice with the chamber of the outlet body, the outlet body carrying near its outer end a male screw thread having a lead between one turn in one half an inch and one turn in one and a half inches, the outlet body and its male screw thread being cored to receive a valve stem to revolve through and within said male thread; said valve stem being recessed on its portion where it passes through the chamber of the valve body and through the orifice at the inner end of the valve body, and having a screw threaded portion at the outer end of the valve stem for a check nut, and carrying on its inner end a valve, the valve being recessed on its outer face to receive the packing ring, the outlet body having on its inner face a valve seat; an operating cap having upon its inside a female screw thread having the same lead as the male screw thread on the outlet body, the operating cap being carried upon the outlet body with its female screw threads meshing with the male screw threads of the outlet body; a float rod attached to the said operating cap; and a float attached to the outer end of the said float rod.

3. In a device of the class described, a supply main, a valve seat therein, a valve engaging with said seat, and adapted to open against the pressure of the water within the main, a cap connected to the stem of the valve, said cap having screw threads of coarse lead thereon, and a stationary part having corresponding screw threads engaging with the screw threads of the cap, and a float for operating the cap to open the valve and permitting the valve to be closed by the pressure of water in the main.

In testimony whereof I affix my signature in presence of two witnesses.

GEORGE WILLIAM FLEMING.

Witnesses:
   EDWIN E. TAIT,
   KATHARINE BURKE.